United States Patent [19]
Nakamura et al.

[11] Patent Number: 5,483,415
[45] Date of Patent: Jan. 9, 1996

[54] SOLID ELECTROLYTIC CAPACITOR AND METHOD OF MAKING THE SAME

[75] Inventors: Shinji Nakamura; Miki Hasegawa, both of Ukyo, Japan

[73] Assignee: Rohm Co., Ltd., Kyoto, Japan

[21] Appl. No.: 202,266

[22] Filed: Feb. 25, 1994

[30] Foreign Application Priority Data

| Feb. 26, 1993 | [JP] | Japan | 5-038166 |
| Feb. 26, 1993 | [JP] | Japan | 5-038167 |
| Feb. 26, 1993 | [JP] | Japan | 5-038168 |

[51] Int. Cl.[6] .................................... H01G 9/012
[52] U.S. Cl. .................. 361/529; 361/534; 361/540; 29/25.03
[58] Field of Search .................. 361/523, 524, 361/525, 528, 529, 532, 533, 534, 535, 539, 540, 301.3; 29/25.03; 427/80

[56] References Cited

U.S. PATENT DOCUMENTS

| 3,588,627 | 6/1971 | Markarian | 361/529 |
| 4,520,430 | 5/1985 | Long et al. | |
| 4,599,788 | 7/1986 | Love et al. | 29/25.03 |

FOREIGN PATENT DOCUMENTS

| 2-123724 | 2/1988 | Japan. | |
| 2-224316 | 9/1990 | Japan | 361/523 |

Primary Examiner—Teresa J. Walberg
Assistant Examiner—Gregory L. Mills
Attorney, Agent, or Firm—William H. Eilberg

[57] ABSTRACT

A solid electrolytic capacitor is provided which comprises a capacitor element including a porous sintered chip of metal particles, a solid electrolytic substance electrically insulated from the metal particles by a dielectric substance, an anode terminal layer electrically connected to the metal particles, and a cathode terminal layer electrically connected to the solid electrolytic substance. The capacitor element has a terminal portion located adjacent to the anode terminal layer and provided with barrier means for preventing the solid electrolytic substance from entering to the terminal portion.

18 Claims, 11 Drawing Sheets

SOLID ELECTROLYTIC CAPACITOR AND METHOD OF MAKING THE SAME

BACKGROUND OF THE INVENTION

1. Field of the Invention

This invention relates to a solid electrolytic capacitor such as tantalum capacitor or aluminum capacitor which is designed for realizing both a size reduction and a capacitance increase. The present invention also relates to a method of making such a capacitor.

2. Description of the Prior Art

A solid electrolytic capacitor such as tantalum capacitor or aluminum capacitor is known to provide a large capacitance with a small size. Typically, such a capacitor is manufactured in the following manner.

Figure 31:
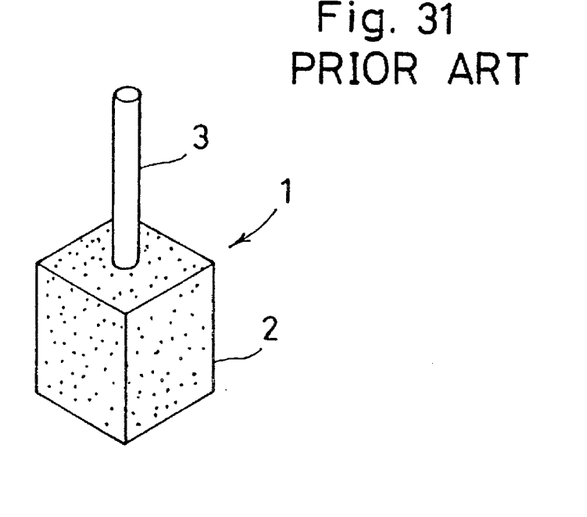
FIG. 31 is a perspective view showing a tantalum chip used for making a prior art solid electrolytic capacitor.

First, as shown in FIG. 31 of the accompanying drawings, metal particles (e.g. tantalum particles) are compacted and sintered into a porous chip 2 which has a metallic anode wire 3 (made of e.g. tantalum) partially embedded in and partially projecting from the chip 2.

Figure 32:
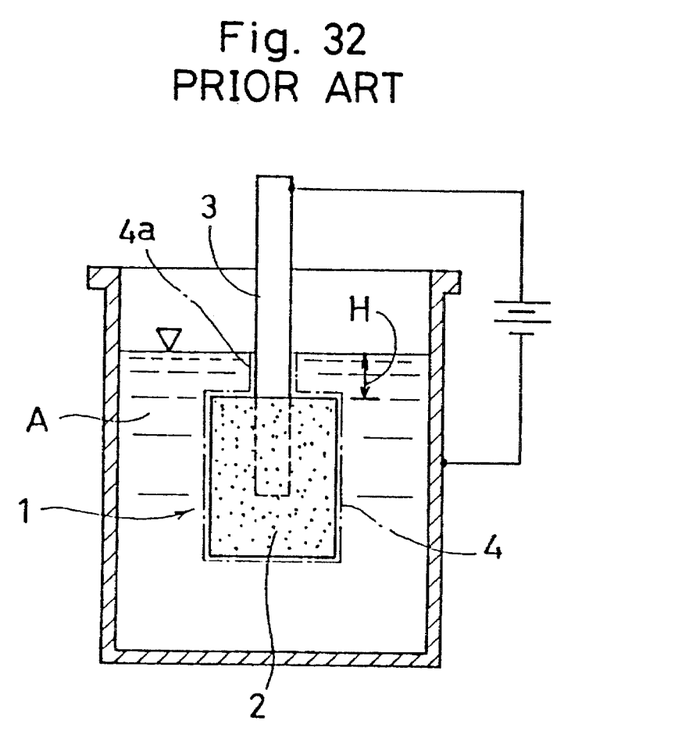
FIG. 32 is a sectional view showing the prior art chip in a condition for performing dielectric coating.

Then, as shown in FIG. 32, the porous chip 2 together with a root portion of the wire 3 is immersed in an aqueous solution A of phosphoric acid and subjected to anodic oxidation (electrolytic oxidation) by applying a direct current. As a result, a dielectric coating (made of e.g. tantalum pentoxide) is formed on the surfaces of the metal particles and on the immersed root of the wire 3. In FIG. 32, only the exposed portion of the dielectric coating is schematically represented by reference numeral 4 in an exaggerated manner for purposes of illustration, and an excess portion of the exposed dielectric coating 4 formed on the root of the wire 3 and having a height H is represented by reference sign 4a.

Figure 33:
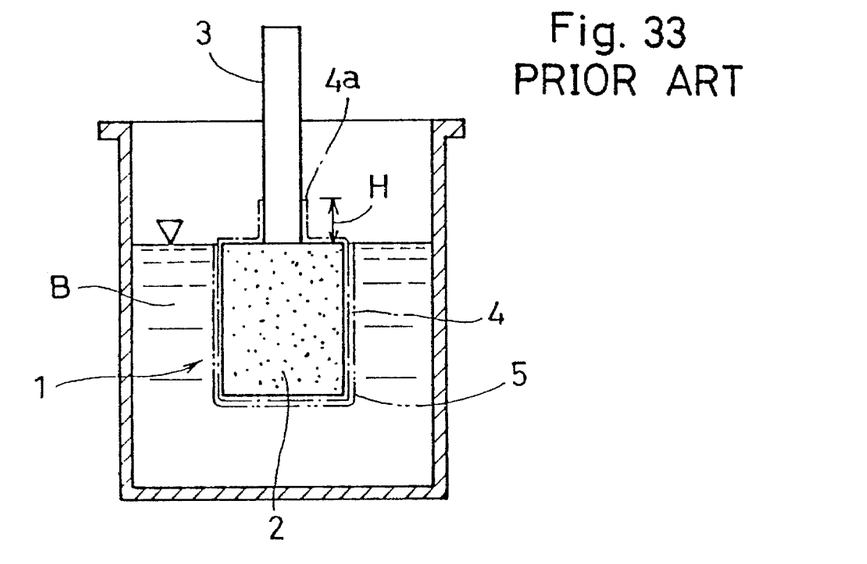
FIG. 33 is a perspective view showing the prior art chip in a condition for performing solid electrolyte formation.

Then, as shown in FIG. 33, the dielectrically coated chip 2 is immersed in an aqueous solution B of manganese nitrate to cause permeation of the solution into the porous chip portion, and thereafter taken out of the solution for baking. This step is repeated plural times to fill the inner voids or pores of the chip 2 with a solid electrolyte (e.g. manganese dioxide) while also forming an exposed solid electrolyte layer 5 over the exposed dielectric coating 4. Alternatively, the solid electrolyte may be made of an organic semiconductor substance which is obtained by chemical polymerization, electrolytic oxidative polymerization or gas phase polymerization.

Then, a metallic cathode layer (not shown) is formed on the solid electrolyte layer 5 (FIG. 33) usually with an intervening layer or layers (e.g. graphite layer) interposed between the cathode layer and the electrolyte layer. A capacitor element 1 is thus obtained.

According to the prior art described above, the excess portion 4a of the dielectric coating 4 on the root of the anode wire 3 is necessary for electrically separating (insulating) between the anode wire 3 and the solid electrolytic substance (namely, the cathode). If the anode wire 3 is cut off at the root thereof, it will be impossible to connect the anode (namely, the metal particles) of the capacitor to an external circuit. Thus, the anode wire 3 of the prior art capacitor must not be cut off at the root thereof.

Figure 34:
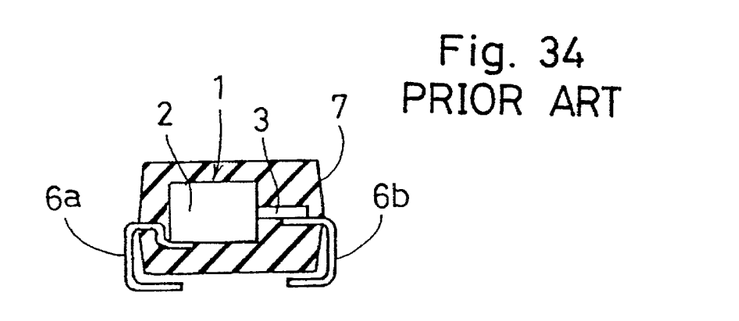
FIG. 34 is a sectional view showing an example of resin-packaging the prior art chip.

In an actual product, therefore, the capacitor element 1 (including the chip 2 and the anode wire 3) is entirely enclosed in a resin package 7, as shown in FIG. 34 and disclosed in Japanese Patent Publication No. 3-30977. In this case, the unillustrated cathode layer formed on the chip 2 is held in electrical contact with a cathode terminal lead 6a, whereas the anode wire 3 is held in electrical contact with an anode terminal lead 6b. The respective terminal leads 6a, 6b project out of the package 7 and are bent toward the underside of the package 7 for conveniently mounting to a surface of a circuit board.

Obviously, the need for entirely enclosing both the chip 2 and the anode wire 3 in the resin package 7 inevitably leads to an increase in the overall size and weight of the capacitor. Thus, the capacitance per unit volume of the packaged capacitor cannot be increased as intended even if the capacitance per unit volume of the capacitor element 1 itself is large.

Further, large stresses are likely to be applied to the chip 2 and the related components 3, 6a, 6b at the time of molding the resin package 7. Therefore, the capacitor may be unexpectedly damaged (resulting in shorting or an increase of leak current) to cause a decreased production yield.

Moreover, the use of the resin package 7 and terminal leads 6a, 6b involves a relatively high material cost, which result in a production cost increase. The cost increase problem is also caused by the fact that the terminal leads 6a, 6b require additional steps of attaching and bending them.

Figure 35:
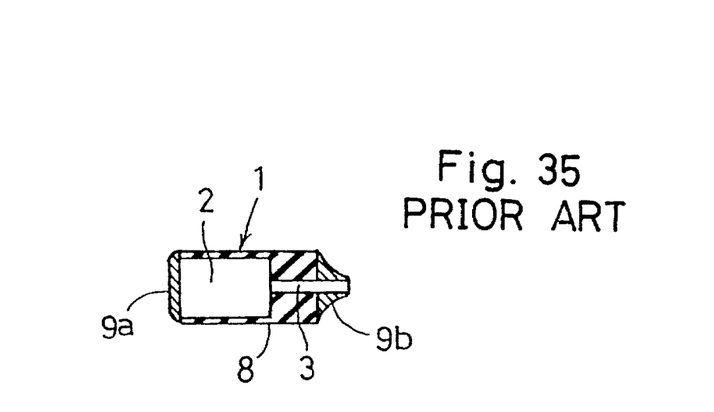
FIG. 35 is a sectional view showing another example of resin-packaging the prior art chip.

In an alternative prior art arrangement shown in FIG. 35, the capacitor element 1 is partially enclosed in a resin package 8 with a part of the chip 2 exposed and with a tip portion of the anode wire 3 projecting out. The exposed part of the chip 2 is formed with a cathode terminal layer, whereas a deposit of e.g. solder is formed at the projecting tip of the anode wire 3 for working as an anode terminal.

While the alternative arrangement eliminates some of the problems associated with the arrangement of FIG. 34, the size and weight reduction achievable by the alternative arrangement is still insufficient because the anode wire 3 must be retained.

SUMMARY OF THE INVENTION

It is, therefore, an object of the present invention to provide a solid electrolytic capacitor which can be greatly reduced in overall size and weight by eliminating the need for providing an anode wire and terminal leads.

Another object of the present invention is to provide a method for making such a capacitor.

According to one aspect of the present invention, there is provided a solid electrolytic capacitor comprising a capacitor element which includes: a porous sintered chip of metal particles; a solid electrolytic substance electrically insulated from the metal particles by a dielectric substance; an anode terminal layer electrically connected to the metal particles; and a cathode terminal layer electrically connected to the solid electrolytic substance; wherein the capacitor element has a terminal portion located adjacent to the anode terminal layer and provided with barrier means for preventing the solid electrolytic substance from entering to the terminal portion.

With the arrangement described above, the barrier means prevents the solid electrolytic substance from entering to the terminal portion, thereby electrically separating (insulating) between the anode and the cathode. Thus, an metallic anode wire, even if used at some stage of making the capacitor, may be removed from the terminal portion in the final product. As a result, it is only necessary to partially package the capacitor element alone, thereby realizing a great reduction in the overall size and weight of the capacitor.

On the other hand, since it is unnecessary to package the entirety of the capacitor element together with part of terminal leads, these components are less subjected to stresses at the time of packaging, thereby reducing the risk of damaging the capacitor. Further, the absence of the terminal leads simplifies the production process and saves the material cost.

According to an embodiment of the present invention, the terminal portion of the capacitor element is provided by one end of the sintered chip which is rendered non-porous to work as the barrier means. The one end of the sintered chip may be rendered non-porous by an insulating substance impregnated in that end of the sintered chip. Examples of the insulating substance include heat-resistant synthetic resin or glass.

Alternatively, the one end of the sintered chip may be rendered non-porous by eliminating voids between the metal particles in that end. The elimination of the voids may be performed by thermally fusing the metal particles together in the relevant end of the sintered chip.

According to another embodiment of the present invention, the barrier means comprises a non-porous metal plate attached to one end of the sintered chip. Further, the terminal portion of the capacitor element may comprise a porous sintered segment of metal particles attached to the non-porous metal plate on a surface thereof away from the sintered chip.

According to another aspect of the present invention, there is provided a method of making a solid electrolytic capacitor comprising the steps of: preparing a porous sintered chip of metal particles; forming a dielectric substance over the entirety of the sintered chip; forming a solid electrolytic substance in and on the sintered chip, the solid electrolytic substance being electrically insulated from the metal particles by the dielectric substance; forming an anode terminal layer in electrical connection to the metal particles; and forming a cathode terminal layer in electrical connection to the solid electrolytic substance; wherein, prior to forming the dielectric substance, a terminal portion is formed at one end of the sintered chip, the terminal portion being located adjacent to the anode terminal layer and provided with barrier means for preventing the solid electrolytic substance from entering to the terminal portion at the time of forming the solid electrolytic substance.

The steps of forming the dielectric substance and the solid electrolytic substance may be performed with a metal wire attached to the terminal portion, the metal wire being removed prior to forming the anode terminal layer. Alternatively, the steps of forming the dielectric substance and the solid electrolytic substance may be performed without attaching a metal wire to the terminal portion.

Other objects, features and advantages of the present invention will be fully understood from the following detailed description given with reference to the accompanying drawings.

DETAILED DESCRIPTION OF THE PREFERRED EMBODIMENT

FIGS. 1 to 10 of the accompanying drawings show successive steps of making a solid electrolytic capacitor according to a first embodiment. In this embodiment, the electrolytic capacitor is a tantalum capacitor.

Figure 1:
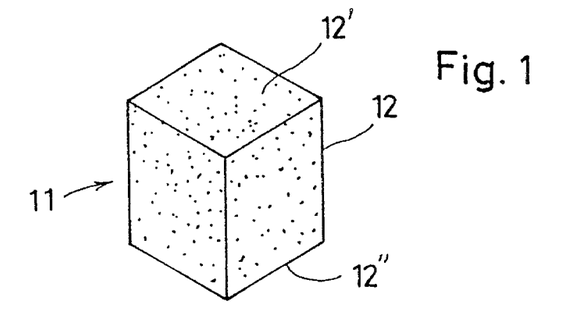
FIG. 1 is a perspective view showing a tantalum chip used for making a solid electrolytic capacitor according to a first embodiment of the present invention.

First, as shown in FIG. 1, tantalum particles are compacted and sintered into a porous chip 12. The compacting and sintering steps may be performed by using known devices.

Figure 2:
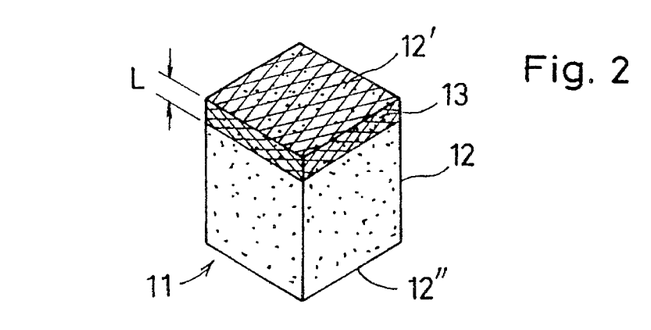
FIG. 2 is a perspective view showing the same chip which is partially impregnated with an insulating substance.

Then, as shown in FIG. 2, one end 12' (upper end in FIG. 2) of the porous chip 12 is impregnated with an insulating substance such as heat-resistant synthetic resin or glass to form a non-porous end portion 13, whereas the remaining portion of the chip 12 is kept porous with a porous end 12" (lower end in FIG. 2). The depth of such impregnation, i.e., the thickness of the non-porous end portion 13, is represented by reference sign L in FIG. 2. The impregnating operation may be performed by immersing the relevant end 12' of the porous chip 12 in a bath (not shown) of a liquid insulating substance or by applying a suitable amount of a liquid insulating substance, for example.

Figure 3:
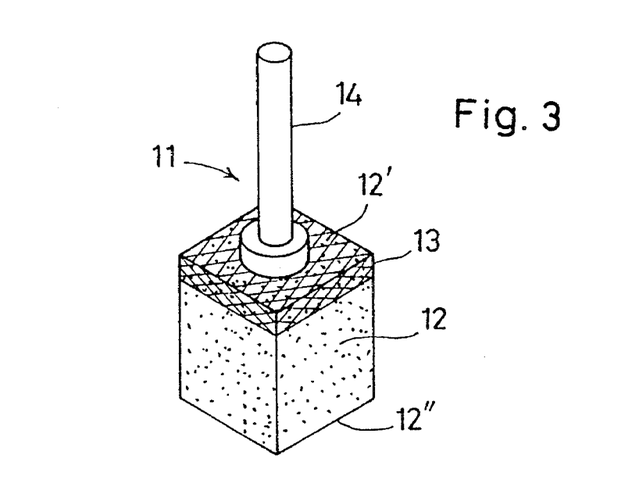
FIG. 3 is a perspective view showing the same chip after attachment to a tantalum wire.

Then, as shown in FIG. 3, a tantalum wire 14 is attached to the non-porous end face 12' of the chip 12. The wire attachment may be performed by welding or by using an electrically conductive heat-resistant paste or adhesive, for example.

Figure 4:
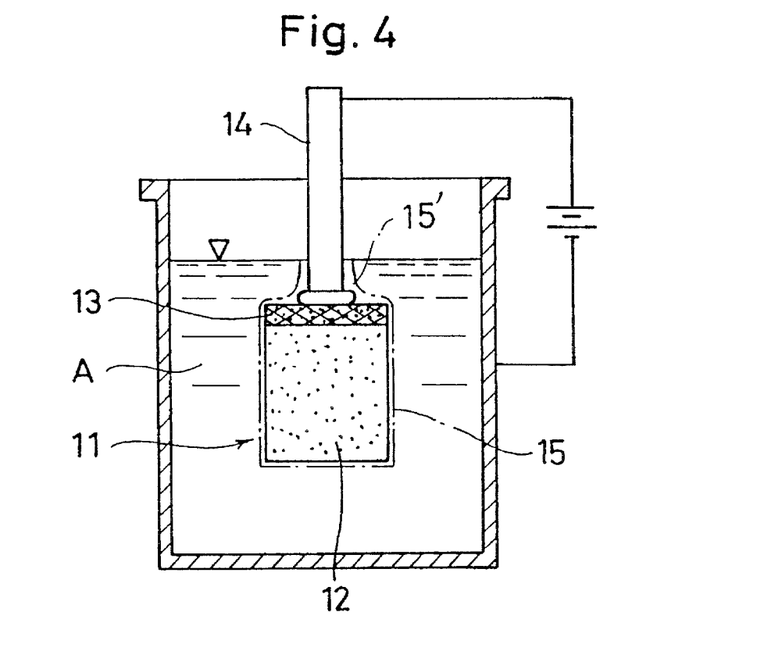
FIG. 4 is a sectional view showing the same chip in a condition for performing dielectric coating.

Then, as shown in FIG. 4, the entirety of the chip 12 together with a root portion of the wire 14 is immersed in an aqueous solution A of phosphoric acid and subjected to anodic oxidation (electrolytic oxidation) by applying a direct current. As a result, a dielectric coating (made of tantalum pentoxide) is formed on the surfaces of the tantalum particles and on the immersed root portion of the tantalum wire 14. In FIG. 4, only the exposed portion of the dielectric coating is schematically represented by reference numeral 15 in an exaggerated manner for purposes of illustration, and a portion of the exposed dielectric coating 15 formed on the root portion of the tantalum wire 14 is represented by reference sign 15'. It should be appreciated that the chip 12 including the exposed coating 15 is still porous except the non-porous end portion 13 because the anodic oxidation occurs only at the surfaces of the tantalum particles.

Figure 5:
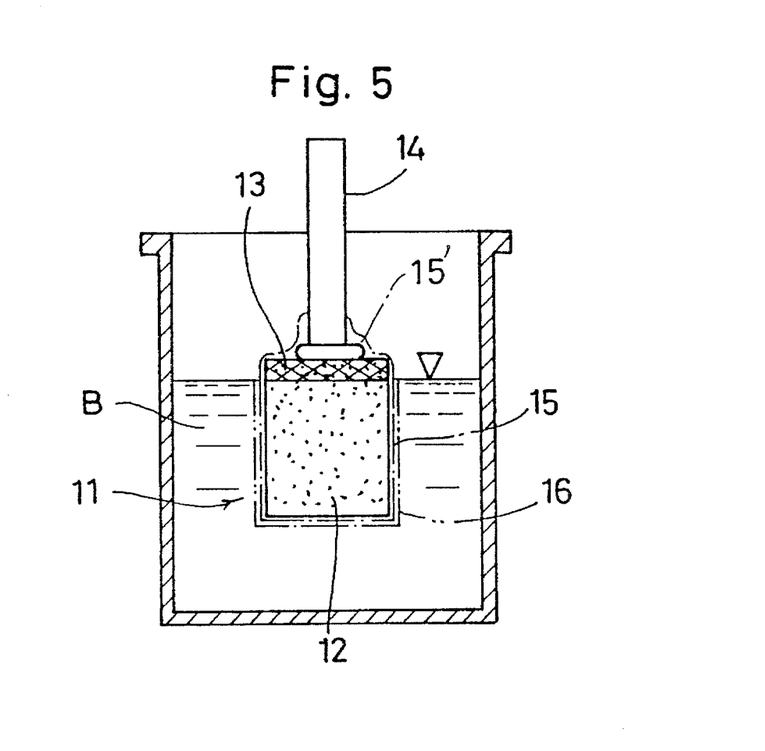
FIG. 5 is a sectional view showing the same chip in a condition for performing solid electrolyte formation.

Then, as shown in FIG. 5, the porous portion of the dielectrically coated chip 12 is immersed in an aqueous solution B of manganese nitrate to cause permeation of the solution into the porous chip portion, and thereafter taken out of the solution for baking. This step is repeated plural times to fill the inner voids or pores of the chip 12 with a solid electrolyte (manganese dioxide) while also forming an exposed solid electrolyte layer 16 over the exposed dielectric coating 15. It should be appreciated that the exposed solid electrolyte layer 16 is much thinner than illustrated in FIG. 5.

At the time of performing the electrolyte forming step, the manganese nitrate solution is prevented from permeating into the non-porous end portion 13 of the chip 12. Thus, the insulating substance contained in the non-porous portion 13 can electrically separate (insulate) the tantalum particles of the non-porous portion 13 from the formed electrolyte with high reliability.

Figure 6:
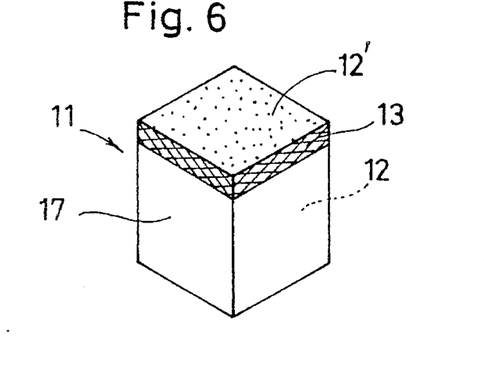
FIG. 6 is a perspective view showing the same chip after formation of a silver layer and after removal of the tantalum wire.

Then, as shown in FIG. 6, a silver layer 17 is formed on the solid electrolyte layer 16 (FIG. 5) over the surfaces of the chip 12 other than the non-porous end portion 13 after graphatizing (not shown). Further, the tantalum wire 14 is detached or cut off from the non-porous end portion 13.

Figure 7:
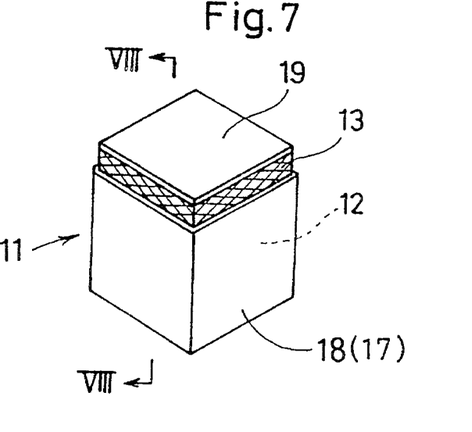
FIG. 7 is a perspective view showing the same chip after formation of anode and cathode terminal layers.
Figure 8:
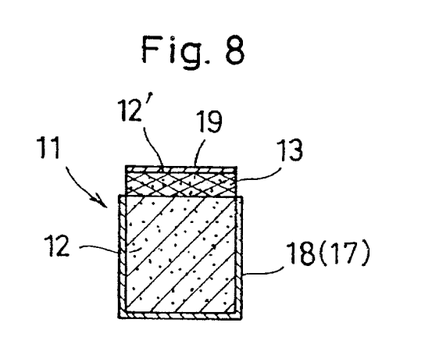
FIG. 8 is a sectional view taken along lines VIII—VIII in FIG. 7.

Then, as shown in FIGS. 7 and 8, a metallic cathode terminal layer 18 is formed on the silver layer 17. The cathode terminal layer 18 may be made of solder for example. Of course, such a cathode terminal layer may be formed only at the bottom of the chip 12. It should be understood that, in FIG. 8, the combination of the silver layer 17 and the cathode terminal layer 18 is shown as a single layer only for convenience of illustration.

Then, as also shown in FIGS. 7 and 8, after subjecting the non-porous end face 12' (FIG. 6) of the chip 12 to a abrading surface treatment for exposing the tantalum particles thereat, a metallic anode terminal layer 19 made of solder for example is formed on the abraded end face 12'. The abrading surface treatment may be a physical treatment which utilizes plasma, or a chemical treatment which utilizes chemical corrosion. Preferably, prior to forming the solder anode terminal layer 19, the abraded end face 12' may be subjected to a conditioning treatment, such as nickel plating, for improving affinity to solder. Indicated by reference numeral 11 in FIGS. 7 and 8 is a capacitor element thus obtained.

Figure 9:
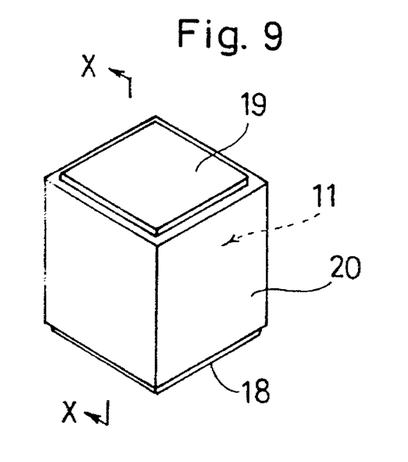
FIG. 9 is a perspective view showing the same chip after formation of a protective layer.
Figure 10:
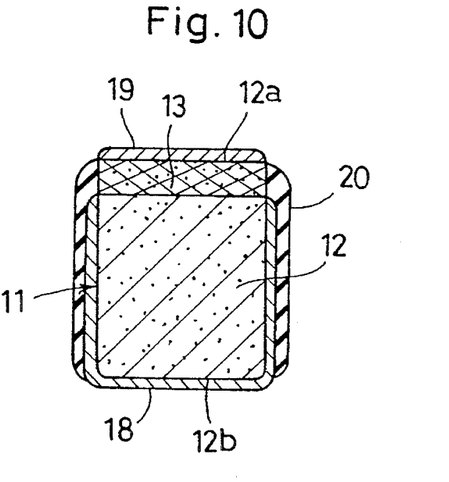
FIG. 10 is a sectional view taken on lines X—X in FIG. 9.

Finally, as shown in FIGS. 9 and 10, a protective layer 20 of e.g. heat-resistant synthetic resin or glass is formed to enclose the capacitor element 11 except the anode terminal layer 19 and the bottom portion of the cathode terminal layer 18 to provide a product solid electrolytic capacitor of the surface mounting type.

According to the first embodiment described above, the insulating substance contained in the non-porous end portion 13 of the chip element 11 reliably prevents the anode terminal layer 19 from being electrically connected to the cathode terminal layer 18 through the solid electrolyte. Thus, the tantalum wire 14 may be removed from the capacitor element 11 together with the dielectric coating portion 15' (at the root portion of the wire 14) which was conventionally necessary for electrically separating between the anode and the cathode. Therefore, it is possible to reduce the overall size and weight of the capacitor in comparison with the prior art.

Due to the provisional use of the tantalum wire 14 (which is later removed) in the first embodiment, at least a part of the existing production line designed suitably for the production of the prior art wire-type solid electrolytic capacitor (see FIG. 34 or 35) may be utilized without any modifications. However, as opposed to the prior art capacitor, the dielectric coating portion 15' at the root of the wire 14 is not necessary for electrically separating the anode (tantalum particles in the non-porous end portion 13) and the cathode (solid electrolyte).

FIGS. 11A to 11D show a second embodiment of the present invention. The second embodiment is similar to the first embodiment but differs therefrom in a few points.

Figure 11A:
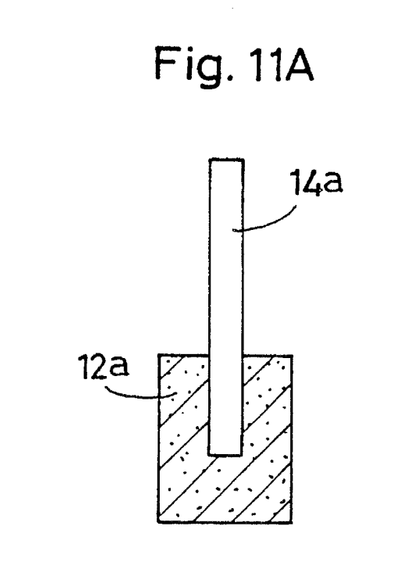
FIGS. 11A through 11D are sectional views showing successive steps of making a solid electrolytic capacitor according to a second embodiment of the present invention.

Specifically, according to the second embodiment, tantalum particles are first compacted and sintered into a porous chip 12a together with a tantalum wire 14a which is partially embedded in and partially projecting from the chip 12a, as shown in FIG. 11A. Such compacting and sintering steps may be exactly the same as those for the prior art wire-type capacitor (see FIGS. 31–35).

Figure 11B:
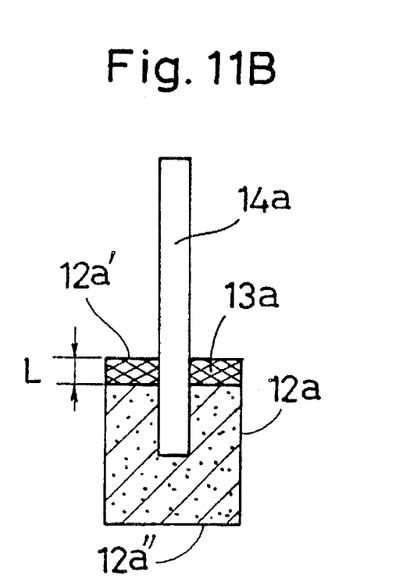

Then, as shown in FIG. 11B, one end 12a' of the porous chip 12a is impregnated with an insulating substance such as heat-resistant synthetic resin or glass to form a non-porous end portion 13a, whereas the remaining portion of the chip 12a is kept porous with a porous end 12a". This process step of the second embodiment may be performed similarly to that of the first embodiment.

Then, the chip 12a is subjected to process steps of forming a dielectric substance (tantalum pentoxide), a solid electrolyte (manganese dioxide) and a silver layer in the same manner as respectively shown in FIGS. 4 to 6 for the first embodiment.

Figure 11C:
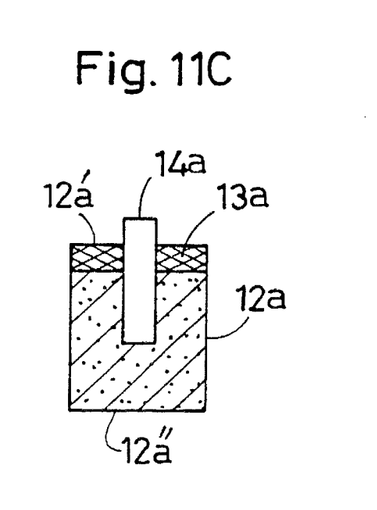

Then, as shown in FIG. 11C, the tantalum wire 14a is cut at a root portion thereof. In this condition, the wire 14a still projects slightly from the non-porous end face 12a' of the chip 12a. It should be appreciated that the dielectric coating, the solid electrolyte layer and the silver layer are omitted in FIG. 11C for convenience of illustration.

Figure 11D:
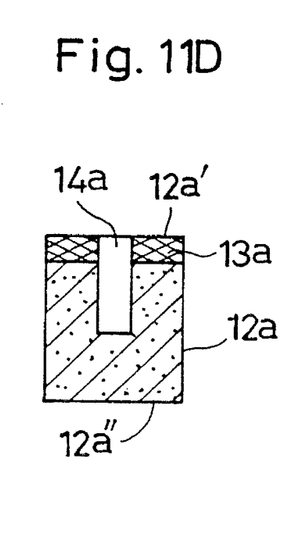

Then, as shown in FIG. 11D, the non-porous end face 12a' of the chip 12a together with the projecting portion of the tantalum wire 14a is subjected to a abrading surface treatment for exposing the tantalum particles at the non-porous end face 12a' while making the wire 14a flush with that end face. Again, it should be appreciated that the dielectric coating, the solid electrolyte layer and the silver layer are omitted in FIG. 11D for the convenience of illustration.

The subsequent process steps are performed for forming a metallic cathode terminal layer (made of e.g. solder), an anode terminal layer (made of e.g. solder) and a protective layer (made of e.g. heat-resistant synthetic resin or glass) in the same manner as shown in FIGS. 7 through 10 for the first embodiment. The resulting product looks similarly to that shown in FIGS. 9 and 10 except that a portion of the tantalum wire 14a remains embedded in the chip 12a (see FIG. 11D).

Due to the use of the tantalum wire 14a which is partially embedded in the chip 12a, the second embodiment is advantageous in that the existing production line for the prior art solid electrolytic capacitor (see FIGS. 31 to 35) may be utilized including even the compacting and sintering devices.

Figure 12A:
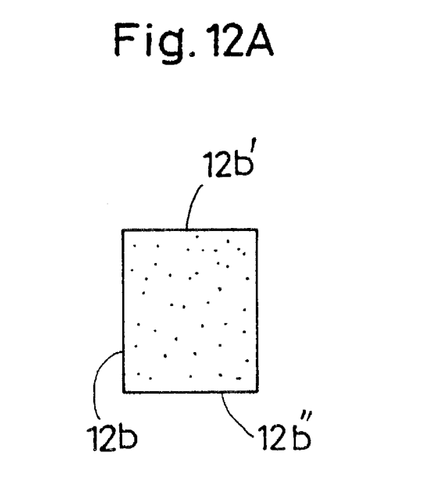
FIGS. 12A through 12C are sectional views showing successive steps of making a solid electrolytic capacitor according to a third embodiment of the present invention.
Figure 12B:
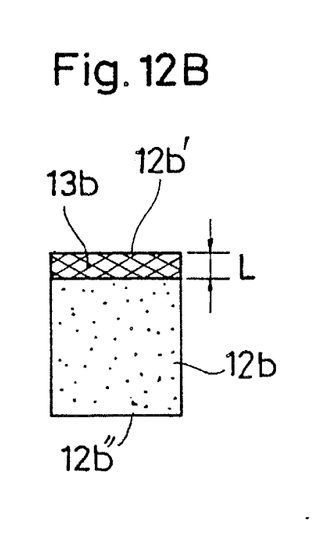
Figure 12C:
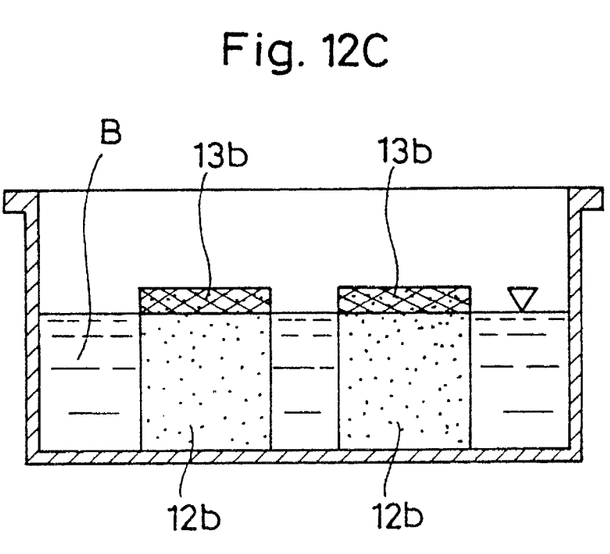

FIGS. 12A to 12C show a third embodiment of the present invention. In this embodiment, no tantalum wire is used.

Specifically, according to the third embodiment, tantalum particles are first compacted and sintered into a porous chip 12b, as shown in FIG. 12A. Such compacting and sintering steps may be exactly the same as those for the first embodiment (see FIG. 1).

Then, as shown in FIG. 12B, one end 12b' of the porous chip 12b is impregnated with an insulating substance such as heat-resistant synthetic resin or glass to form a non-porous end portion 13b, whereas the remaining portion of the chip 12b is kept porous with a porous end 12b". This process step of the third embodiment may be also performed similarly to that of the first embodiment.

Then, instead of performing the anodic oxidation (electrolytic oxidation) applied in the first embodiment (see FIG. 4), the chip 12b is subjected to oxidation in an oxygen gas atmosphere for forming a dielectric substance (tantalum pentoxide). The gas phase oxidation is necessary because the electrolytic oxidation (liquid phase oxidation) is difficult without prior attachment of a tantalum wire which works as one electrolytic pole and a workpiece holding handle.

Then, as shown in FIG. 12C, the porous portion of the oxidized or dielectrically coated chip 12b is immersed in an aqueous solution B of manganese nitrate to cause permeation of the solution into the porous chip portion, and thereafter taken out of the solution for baking. This step is repeated plural times to form a solid electrolyte (manganese dioxide) inside and outside the chip 12b.

Instead of directly immersing the chip 12b in a bath of manganese nitrate solution B, the electrolyte forming step may be performed by applying a manganese nitrate solution to the chip 12b through a suitable dispenser. Alternatively, the chip 12b may be brought into contact with a sponge which is previously made to contain a suitable amount of manganese nitrate solution.

Further, the solid electrolyte, which is made of manganese dioxide according to the third embodiment (and the first and second embodiments as well), may be made of an organic semiconductor substance which is obtained by chemical polymerization, electrolytic oxidative polymerization or gas phase polymerization.

The subsequent process steps of the third embodiment are substantially the same as those of the first embodiment, including an abrading step and the formation of a silver layer, a metallic cathode terminal layer (made of e.g. solder), an anode terminal layer (made of e.g. solder) and a protective layer (made of e.g. heat-resistant synthetic resin or glass).

Obviously, due to the complete absence of a tantalum wire, the third embodiment is advantageous in omitting the steps of attaching and removing (cutting) a tantalum wire. Thus, the production process as a whole may be simplified with a resultant reduction in material and production cost.

FIGS. 13 to 21 show a fourth embodiment of the present invention.

Figure 13:
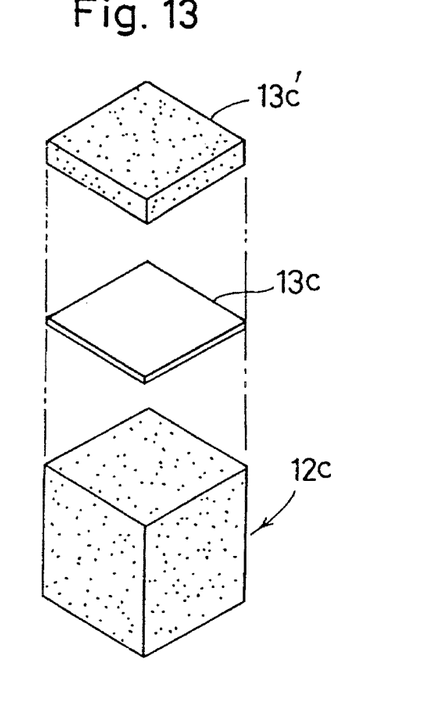
FIG. 13 is a perspective view showing a capacitor element, in an exploded state, used for making a solid electrolytic capacitor according to a fourth embodiment of the present invention.

According to the fourth embodiment, tantalum particles are first compacted and sintered into a porous chip 12c, as shown in FIG. 13. On the other hand, a non-porous thin tantalum plate 13c and a porous sintered end segment 13c' of tantalum particles are prepared separately from the porous chip 12c, as also shown in FIG. 13.

Figure 14:
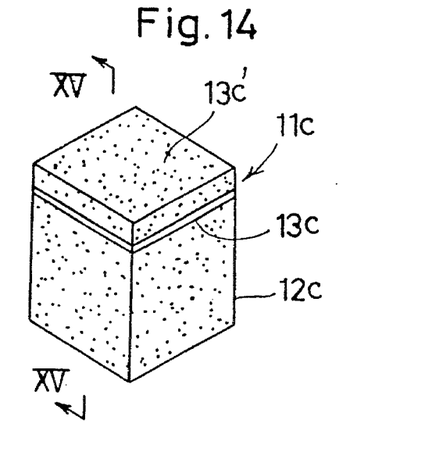
FIG. 14 is a perspective view showing the same capacitor element in an integrated state.
Figure 15:
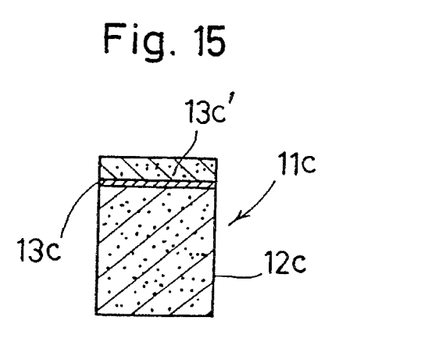
FIG. 15 is a sectional view taken along lines XV—XV in FIG. 14.

Then, as shown in FIGS. 14 and 15, the porous chip 12c and the porous end segment 13c' together with the non-porous plate 13c interposed therebetween are stacked and connected to each other for integration by welding or by using an electrically conductive heat-resistant paste or adhesive. As a result, an integrated body or capacitor element 11c is obtained.

Alternatively, the porous chip 12c, the non-porous plate 13c and the porous end segment 13c' may be stacked together prior to sintering of the porous elements 12c, 13c' and connected to each other for integration by the subsequent sintering step.

Figure 16:
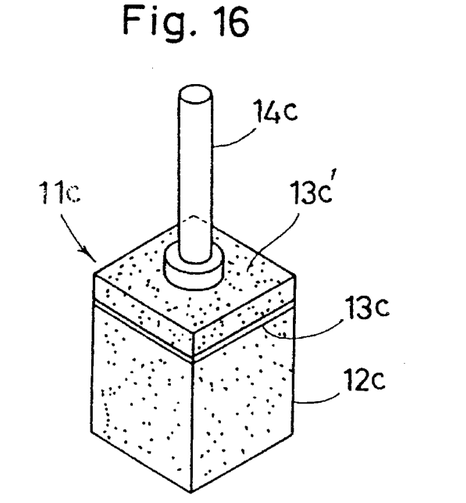
FIG. 16 is a perspective view showing the same capacitor element after attachment to a tantalum wire.

Then, as shown in FIG. 16, a tantalum wire 14c is attached to the porous end segment 13c' of the capacitor element 11c. The wire attachment may be performed by welding or by using an electrically conductive heat-resistant paste or adhesive, for example.

Then, the capacitor element 11c is entirely immersed in an aqueous solution of phosphoric acid (not shown) and subjected to anodic oxidation (electrolytic oxidation) by applying a direct current in the same manner as in the first embodiment (see FIG. 4). As a result, a dielectric coating (made of tantalum pentoxide) is formed on the surfaces of the tantalum particles in the porous chip 12c and the porous end segment 13c' as well as on the surfaces of the non-porous tantalum plate 13c.

Then, the dielectrically coated porous chip 12c of the capacitor element 11c is subjected to electrolyte formation by immersing the chip 12c in an aqueous manganese nitrate solution (not shown) in the same manner as in the first embodiment (see FIG. 5). At this time, the non-porous tantalum plate 13c prevents the manganese nitrate solution from permeating into the porous end segment 13c' of the capacitor element 11c. Thus, the dielectric coating (tantalum pentoxide) formed on the surfaces of the non-porous tantalum plate 13c and porous end segment 13c' can electrically separate (insulate) the tantalum particles of the porous end segment 13c' from the formed electrolyte with high reliability.

Figure 17:
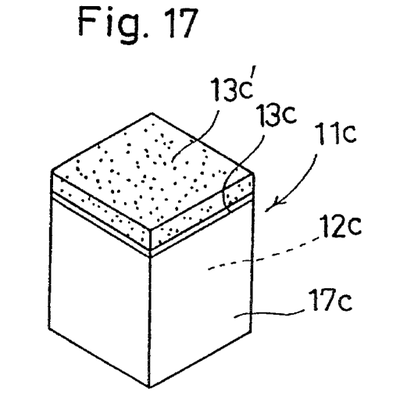
FIG. 17 is a perspective view showing the same capacitor element after formation of a silver layer and after removal of the tantalum wire.

Then, as shown in FIG. 17, a silver layer 17c is formed on the solid electrolyte layer (which is not shown in FIG. 17 but similar to the layer 16 shown in FIG. 5) over the surfaces of the porous chip 12c after graphatizing (not shown). Further, the tantalum wire 14c is detached or cut off from the porous end segment 13c'.

Figure 18:
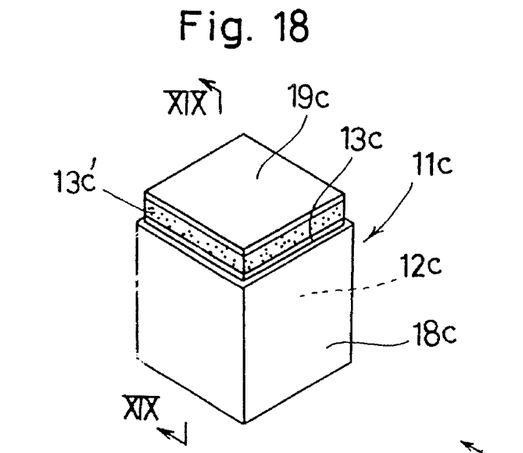
FIG. 18 is a perspective view showing the same capacitor element after formation of anode and cathode terminal layers.
Figure 19:
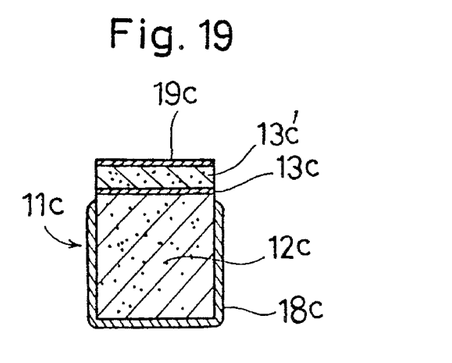
FIG. 19 is a sectional view taken along lines XIX—XIX in FIG. 18.

Then, as shown in FIGS. 18 and 19, a metallic cathode terminal layer 18c made of e.g. solder is formed on the silver layer 17c. The cathode terminal layer 18c may be formed only on the bottom face of the chip 12c.

Then, as also shown in FIGS. 18 and 19, after abrading the end face of the end segment 13c', a metallic anode terminal layer 19c made of solder for example is formed on the abraded end face. Preferably, prior to forming the solder anode terminal layer 19c, the abraded end face may be subjected to a conditioning treatment, such as nickel plating, for improving affinity to solder.

Figure 20:
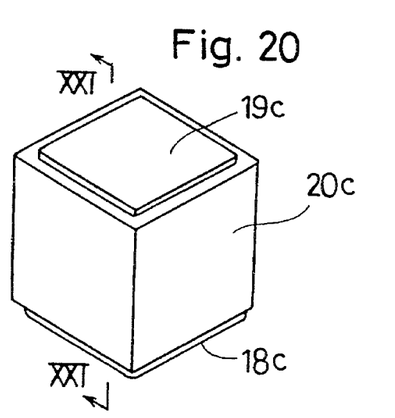
FIG. 20 is a perspective view showing the same capacitor element after formation of a protective layer.
Figure 21:
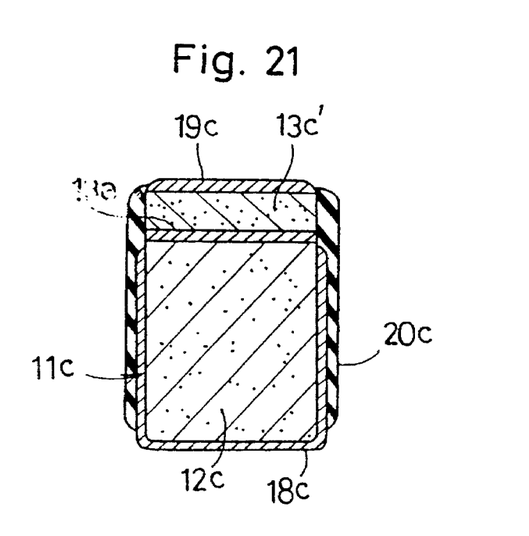
FIG. 21 is a sectional view taken along lines XXI—XXI in FIG. 20.

Finally, as shown in FIGS. 20 and 21, a protective layer 20c of e.g. heat-resistant synthetic resin or glass is formed to enclose the capacitor element 11c except the anode terminal layer 19c and the bottom portion of the cathode terminal layer 18c to provide a product solid electrolytic capacitor of the surface mounting type.

Figure 22:
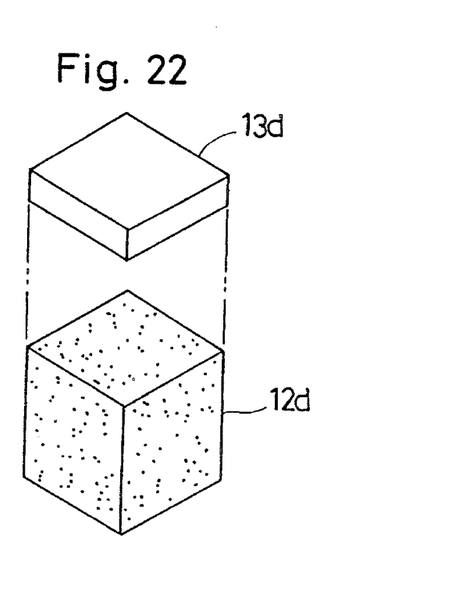
FIG. 22 is a perspective view showing a capacitor element, in an exploded state, used for making a solid electrolytic capacitor according to a fifth embodiment of the present invention.

FIG. 22 shows a fifth embodiment of the present invention which differs from the fourth embodiment only in that a sintered chip 12d of tantalum particles is integrated at one end thereof with a non-porous tantalum plate 13d alone. The process steps after integration are similar to those of the fourth embodiment.

Obviously, the fourth and fifth embodiments may be practiced without the use of the tantalum wire 14c (FIG. 16).

FIGS. 23 to 30 show a sixth embodiment of the present invention.

Figure 23:
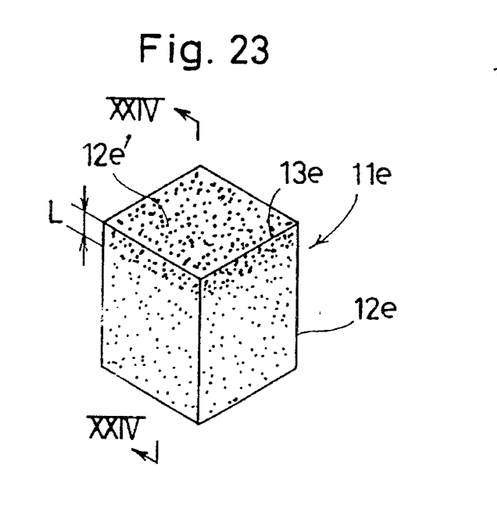
FIG. 23 is a perspective view showing a tantalum chip used for making a solid electrolytic capacitor according to a sixth embodiment of the present invention.
Figure 24:
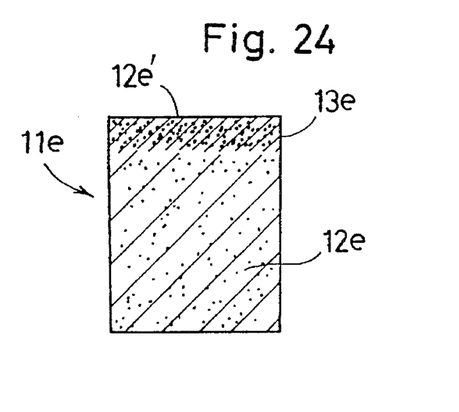
FIG. 24 is a sectional view taken along lines XXIV—XXIV in FIG. 23.

According to the sixth embodiment, tantalum particles are first compacted and sintered into a porous chip 12e, and one end 12e' of the chip 12e is converted into a non-porous end portion 13e, as shown in FIGS. 23 and 24. Such partial conversion of the porous chip 12e may be performed by irradiating a laser beam to the relevant end 12e' to cause thermal fusion of the tantalum particles.

Figure 25:
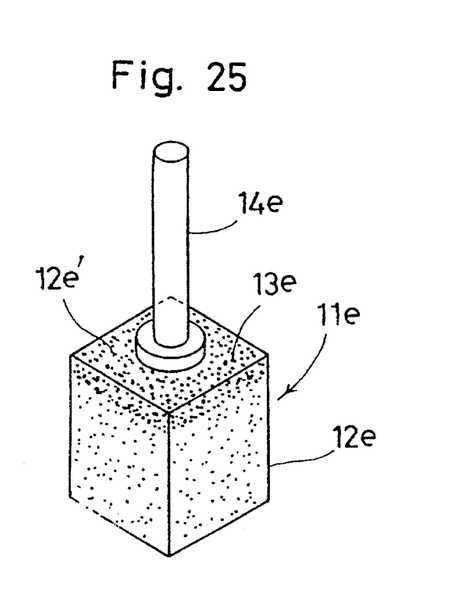
FIG. 25 is a perspective view showing the chip of FIG. 23 after attachment to a tantalum wire.

Then, as shown in FIG. 25, a tantalum wire 14c is attached to the non-porous end face 12e' of the chip 12e.

Then, the chip 12e is entirely immersed in an aqueous solution of phosphoric acid (not shown) and subjected to anodic oxidation (electrolytic oxidation) by applying a direct current in the same manner as in the first embodiment (see FIG. 4). As a result, a dielectric coating (made of tantalum pentoxide) is formed on the surfaces of the tantalum particles in the porous portion of the chip 12e and the surfaces of the non-porous end portion 13e.

Then, the porous portion of the dielectrically coated chip 12e is subjected to electrolyte formation by immersing the porous portion in an aqueous manganese nitrate solution (not shown) in the same manner as in the first embodiment (see FIG. 5). At this time, the non-porous end portion 13e prevents the manganese nitrate solution from permeating into the porous end segment 13c' of the capacitor element 11c. Thus, the dielectric coating (tantalum pentoxide) formed on the surfaces of the non-porous end portion 13e can electrically separate (insulate) the tantalum particles of the porous chip portion from the formed electrolyte with high reliability.

Figure 26:
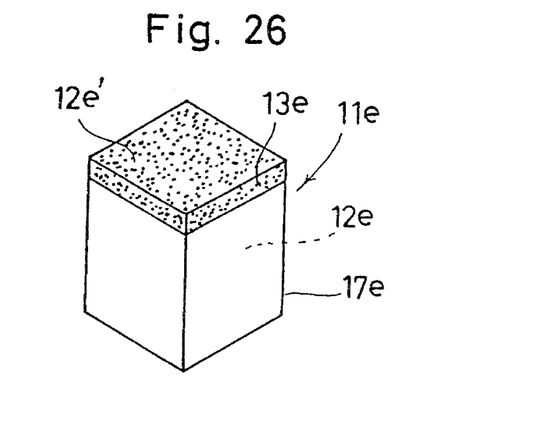
FIG. 26 is a perspective view showing the chip of FIG. 25 after formation of a silver layer and after removal of the tantalum wire.

Then, as shown in FIG. 26, a silver layer 17e is formed on the solid electrolyte layer (which is not shown in FIG. 26 but similar to the layer 16 shown in FIG. 5) over the surfaces of the porous chip portion after graphatizing (not shown). Further, the tantalum wire 14e is detached or cut off from the porous end portion 13e.

Figure 27:
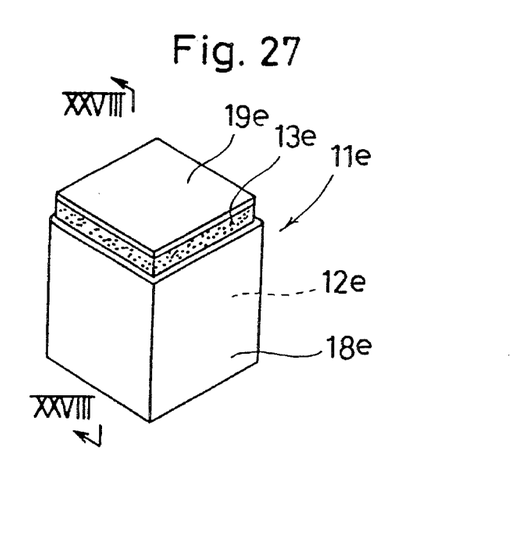
FIG. 27 is a perspective view showing the chip of FIG. 26 after formation of anode and cathode terminal layers.
Figure 28:
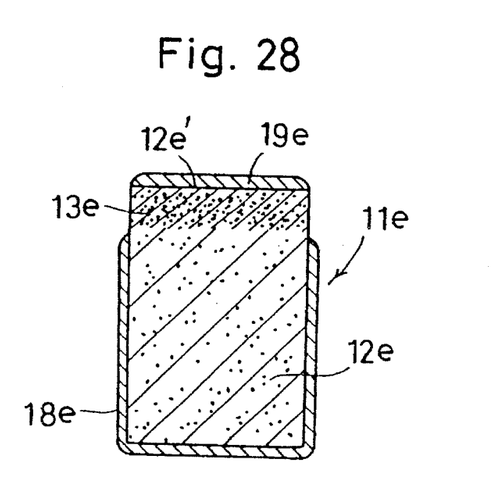
FIG. 28 is a sectional view taken along lines XXVIII—XXVIII in FIG. 27.

Then, as shown in FIGS. 27 and 28, a metallic cathode terminal layer 18e made of e.g. solder is formed on the silver layer 17e. The cathode terminal layer 18e may be formed only on the bottom face of the chip 12e.

Then, as also shown in FIGS. 27 and 28, after abrading the end face 12e' of the porous end portion 13e, a metallic anode terminal layer 19e made of solder for example is formed on the abraded end face. Preferably, prior to forming the solder anode terminal layer 19e, the abraded end face may be subjected to a conditioning treatment, such as nickel plating, for improving affinity to solder.

Figure 29:
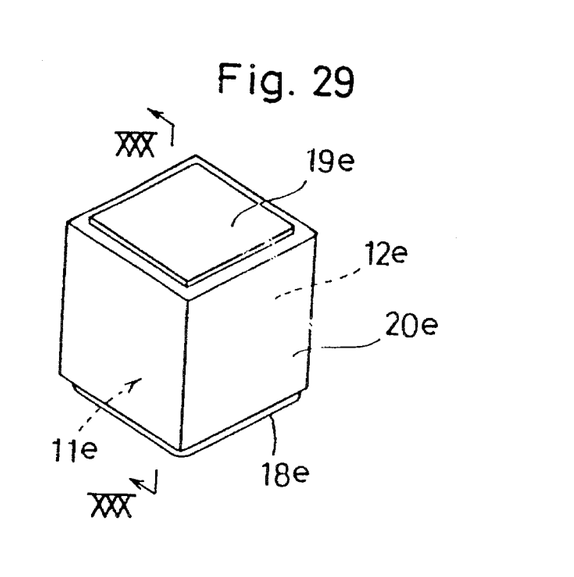
FIG. 29 is a perspective view showing the chip of FIG. 27 after formation of a protective layer.
Figure 30:
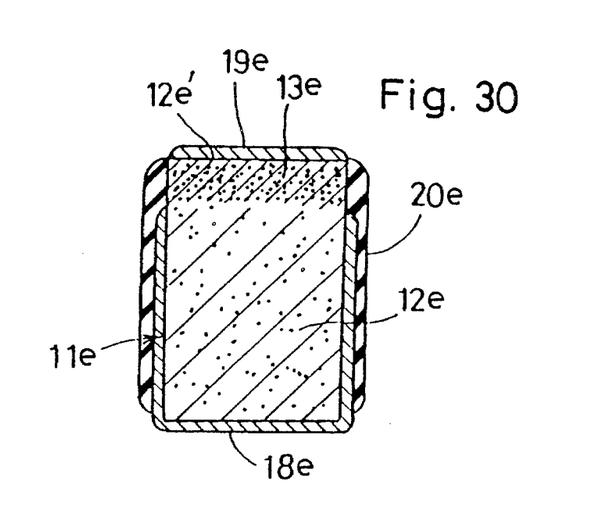
FIG. 30 is a sectional view taken along lines XXX—XXX in FIG. 29.

Finally, as shown in FIGS. 29 and 30, a protective layer 20e of e.g. heat-resistant synthetic resin or glass is formed to enclose the capacitor element 11c except the anode terminal layer 19e and the bottom portion of the cathode terminal layer 18e to provide a product solid electrolytic capacitor of the surface mounting type.

Obviously, the sixth embodiment may be practiced without the use of the tantalum wire 14e (FIG. 25).

The present invention being thus described, it is obvious that the same may be varied in many ways. For instance, the present invention is applicable not only to a tantalum capacitor but also to other solid electrolytic capacitor such as aluminum capacitor. Such variations are not to be regarded as a departure from the spirit and scope of the invention, and all such variations as would be obvious to those skilled in the art are intended to be included within the scope of the following claims.

We claim:

1. A solid electrolytic capacitor comprising a capacitor element which includes:

a porous sintered chip of metal particles;

a solid electrolytic substance electrically insulated from the metal particles by a dielectric substance;

an anode terminal layer electrically connected to the metal particles;

a cathode terminal layer spaced from the anode terminal layer and electrically connected to the solid electrolytic substance, the cathode terminal layer covering the chip, the cathode terminal layer having an exposed end portion and a lateral portion extending toward the anode terminal layer;

wherein the capacitor element has a terminal portion located adjacent to the anode terminal layer and provided with barrier means for preventing the solid electrolytic substance from entering the terminal portion; and wherein the capacitor further comprises a one-piece insulating protective layer covering the lateral portion of the cathode terminal layer but not covering end faces of the chip, the protective layer extending beyond the lateral portion of the cathode terminal layer onto the terminal portion of the capacitor element where the barrier means is provided.

2. The capacitor according to claim 1, wherein the terminal portion of the capacitor element is provided by one end of the sintered chip, said one end of the sintered chip being rendered non-porous to work as the barrier means.

3. The capacitor according to claim 2, wherein said one end of the sintered chip is rendered non-porous by an insulating substance impregnated in said one end of the sintered chip.

4. The capacitor according to claim 3, wherein the insulating substance is selected from a group consisting of heat-resistant synthetic resin and glass.

5. The capacitor according to claim 2, wherein said one end of the sintered chip is rendered non-porous by eliminating voids between the metal particles in said one end.

6. The capacitor according to claim 5, wherein said one end of the sintered chip is rendered non-porous by thermally fusing the metal particles in said one end together.

7. The capacitor according to claim 1, wherein the barrier means comprises a non-porous metal plate attached to one end of the sintered chip.

8. The capacitor according to claim 7, wherein the terminal portion of the capacitor element comprises a porous sintered segment of metal particles attached to the non-porous metal plate on a surface thereof away from the sintered chip.

9. The capacitor according to claim 1, wherein the metal particles are tantalum particles, whereas the dielectric substance is tantalum pentoxide.

10. The capacitor according to claim 1, wherein the solid electrolyte is manganese dioxide.

11. A method of making a solid electrolytic capacitor comprising the steps of:

preparing a porous sintered chip of metal particles;

forming a dielectric substance over the entirety of the sintered chip;

forming a solid electrolytic substance in and on the sintered chip, the solid electrolytic substance being electrically insulated from the metal particles by the dielectric substance;

forming an anode terminal layer in electrical connection to the metal particles; and forming a cathode terminal layer in electrical connection to the solid electrolytic substance;

wherein, prior to forming the dielectric substance, a terminal portion is formed at one end of the sintered chip, the terminal portion being located adjacent to the anode terminal layer and provided with barrier means for preventing the solid electrolytic substance from entering the terminal portion at the time of forming the solid electrolytic substance; and wherein the steps of forming the dielectric substance and the solid electrolytic substance are performed with a metal wire bonded to the terminal portion, the metal wire being removed prior to forming the anode terminal layer.

12. The method according to claim 11, wherein the terminal portion is provided by one end of the sintered chip itself, said one end of the sintered chip being rendered non-porous to work as the barrier means.

13. The method according to claim 12, wherein said one end of the sintered chip is rendered non-porous by impregnating an insulating substance in said one end of the sintered chip.

14. The method according to claim 13, wherein the insulating substance is selected from a group consisting of heat-resistant synthetic resin and glass.

15. The method according to claim 12, wherein said one end of the sintered chip is rendered non-porous by eliminating voids between the metal particles in said one end.

16. The method according to claim 15, wherein said one end of the sintered chip is rendered non-porous by thermally fusing the metal particles in said one end together.

17. The method according to claim 11, wherein the barrier means is formed by attaching a non-porous metal plate to said one end of the sintered chip.

18. The method according to claim 17, wherein the terminal portion comprises a porous sintered segment of metal particles attached to the non-porous metal plate on a surface thereof away from the sintered chip.

* * * * *